(12) United States Patent
Yokose et al.

(10) Patent No.: US 9,729,880 B2
(45) Date of Patent: Aug. 8, 2017

(54) INFORMATION PROCESSING APPARATUS, INFORMATION PROCESSING METHOD, AND STORAGE MEDIUM

(71) Applicant: FUJI XEROX CO., LTD., Tokyo (JP)

(72) Inventors: Taro Yokose, Kanagawa (JP); Tomoki Taniguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 2 days.

(21) Appl. No.: 14/681,819

(22) Filed: Apr. 8, 2015

(65) Prior Publication Data

US 2016/0088301 A1 Mar. 24, 2016

(30) Foreign Application Priority Data

Sep. 19, 2014 (JP) .................................. 2014-190736

(51) Int. Cl.
*G06K 9/00* (2006.01)
*H04N 19/124* (2014.01)
*H04N 19/61* (2014.01)

(52) U.S. Cl.
CPC .......... *H04N 19/124* (2014.11); *H04N 19/61* (2014.11)

(58) Field of Classification Search
CPC ...... H04N 19/124; H04N 19/91; H04N 19/61; H04N 19/11; H04N 19/13; H04N 9/3188
See application file for complete search history.

(56) References Cited

U.S. PATENT DOCUMENTS

| | | | | |
|---|---|---|---|---|
| 3,781,686 | A * | 12/1973 | Ching | H04B 14/066 341/143 |
| 6,956,900 | B2 * | 10/2005 | Roh | H04N 19/61 375/240.03 |
| 8,559,502 | B2 * | 10/2013 | Amon | H04N 19/159 375/240.03 |
| 2003/0231796 | A1 * | 12/2003 | Caviedes | H04N 19/176 382/239 |
| 2006/0088223 | A1 * | 4/2006 | Matsuhira | H04N 19/48 382/233 |
| 2007/0229325 | A1 * | 10/2007 | Yokose | H04N 19/149 341/51 |
| 2009/0067492 | A1 * | 3/2009 | Amon | H04N 19/159 375/240.03 |
| 2009/0225833 | A1 * | 9/2009 | Han | H04N 19/105 375/240.12 |
| 2009/0257656 | A1 * | 10/2009 | Shi | G06T 7/0004 382/190 |
| 2010/0135389 | A1 * | 6/2010 | Tanizawa | H04N 19/159 375/240.12 |

(Continued)

FOREIGN PATENT DOCUMENTS

JP 5-37919 A 2/1993

*Primary Examiner* — Aaron W Carter
(74) *Attorney, Agent, or Firm* — Sughrue Mion, PLLC

(57) ABSTRACT

An information processing apparatus includes a quantization unit that further quantizes a quantized first code, and hence generates a second code; an inverse quantization unit that inversely quantizes the second code quantized by the quantization unit, and hence generates a third code; a calculating unit that calculates a difference between the first code and the second code; a first encoding unit that encodes the second code; and a second encoding unit that encodes the difference calculated by the calculating unit.

8 Claims, 11 Drawing Sheets

(56) References Cited

U.S. PATENT DOCUMENTS

| | | | | |
|---|---|---|---|---|
| 2013/0044808 A1* | 2/2013 | Nakagawa | ........... | H04N 19/105 375/240.03 |
| 2014/0193089 A1* | 7/2014 | Sato | .................... | H04N 19/176 382/251 |
| 2016/0088301 A1* | 3/2016 | Yokose | ................ | H04N 19/124 382/238 |

* cited by examiner

FIG. 3A
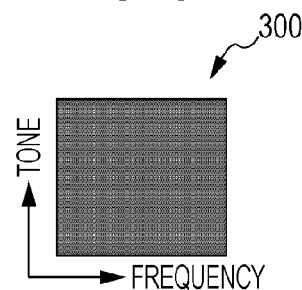
FIG. 3B
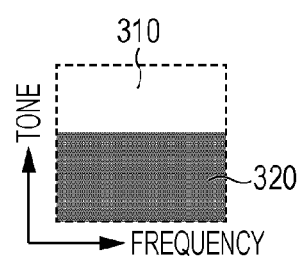
FIG. 3C
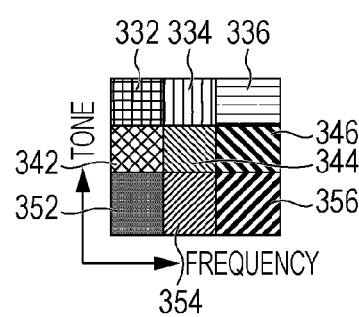
FIG. 3D
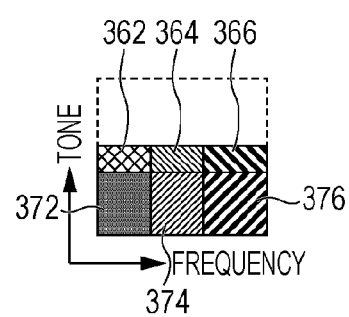
FIG. 4A  FIG. 4B  FIG. 4C  FIG. 4D
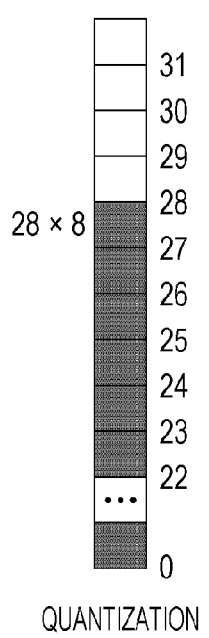
QUANTIZATION
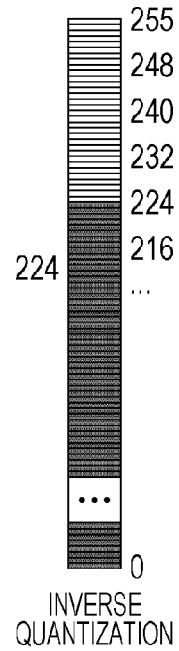
INVERSE QUANTIZATION
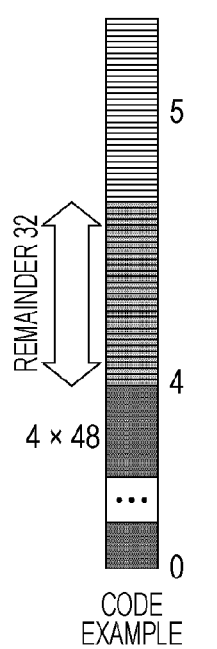
CODE EXAMPLE
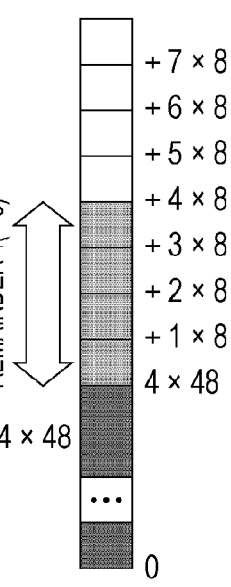
REMAINDER

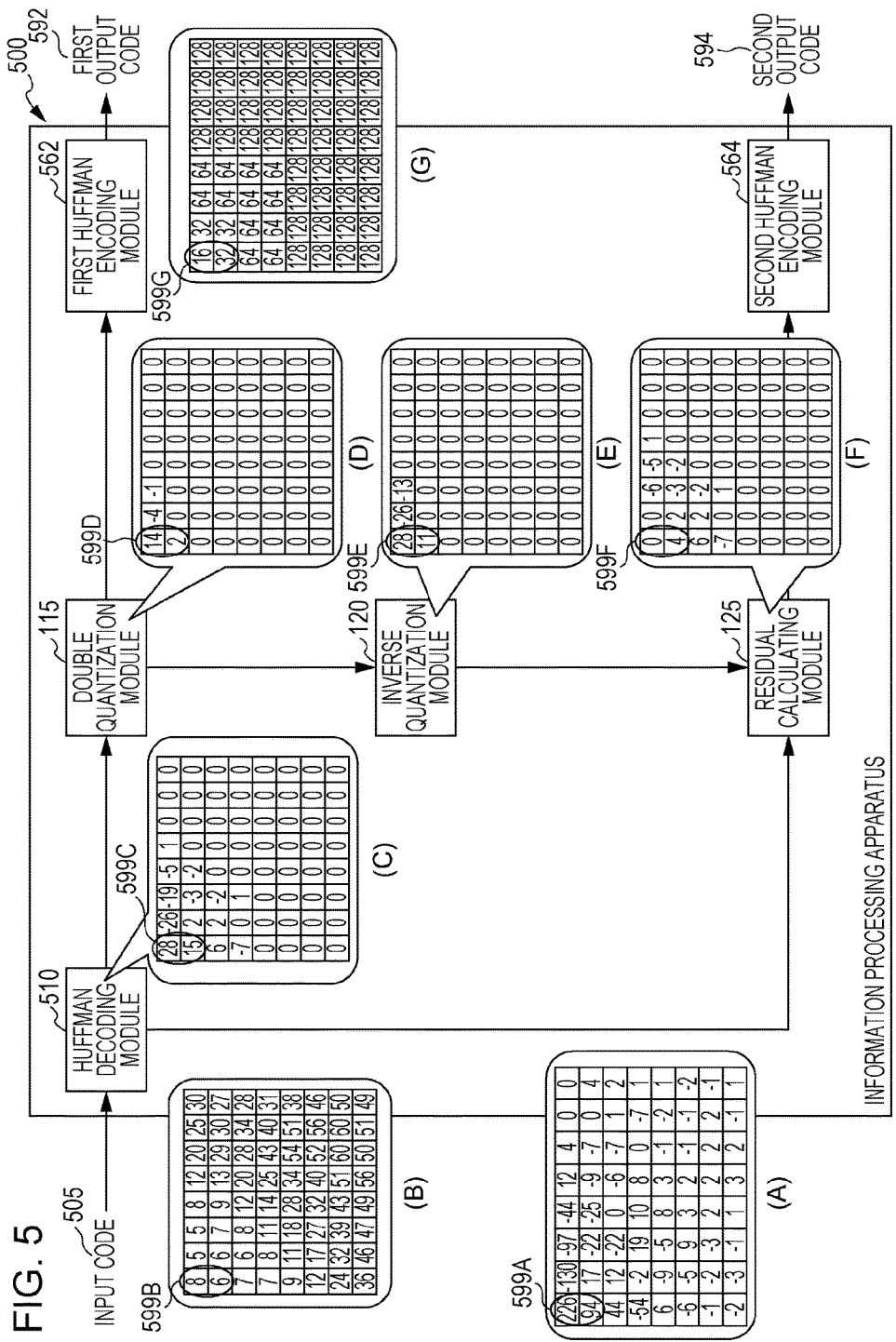

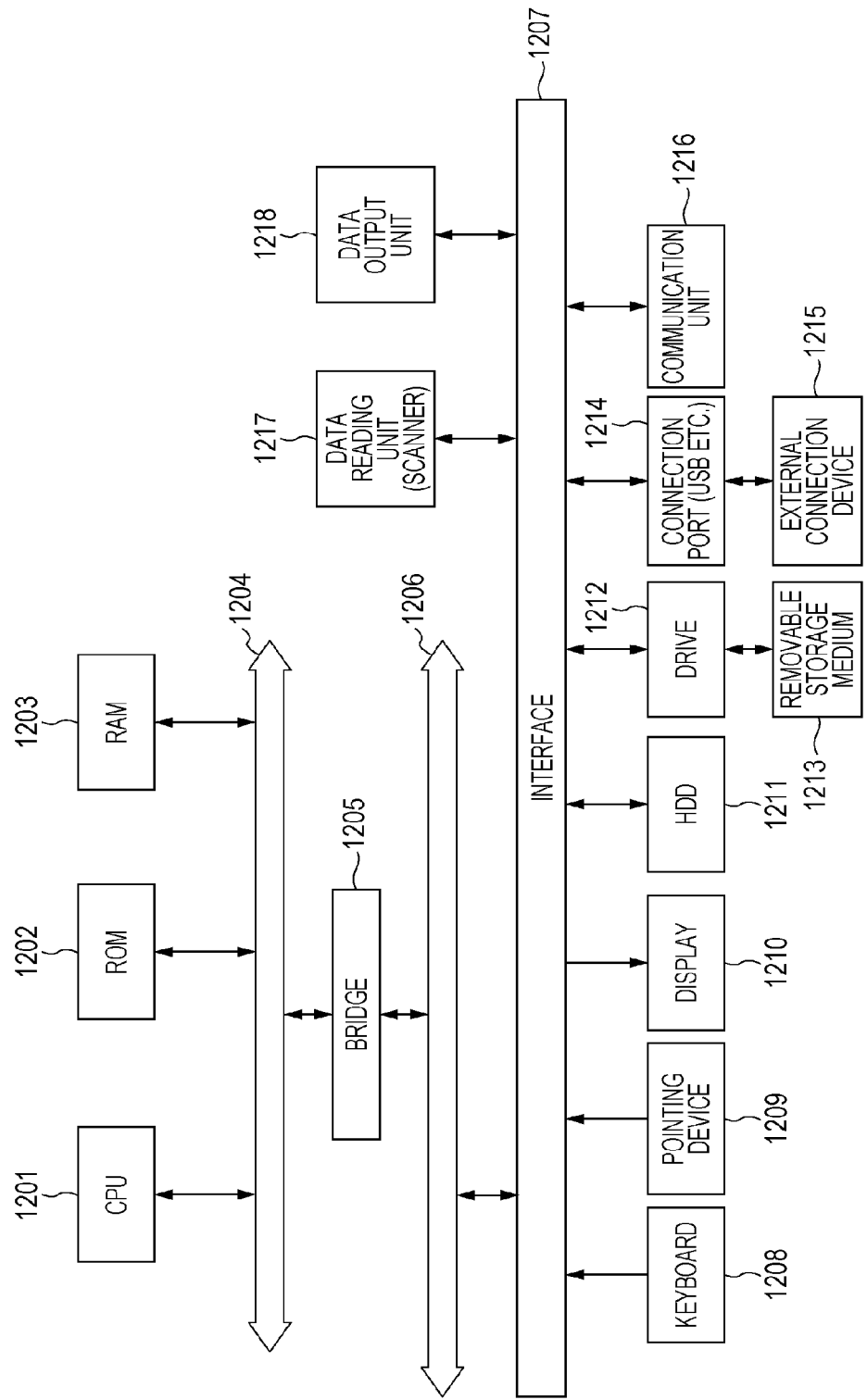

INFORMATION PROCESSING APPARATUS, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2014-190736 filed Sep. 19, 2014.

BACKGROUND

The present invention relates to an information processing apparatus, an information processing method, and a storage medium.

SUMMARY

According to an aspect of the invention, there is provided an information processing apparatus including a quantization unit that further quantizes a quantized first code, and hence generates a second code; an inverse quantization unit that inversely quantizes the second code quantized by the quantization unit, and hence generates a third code; a calculating unit that calculates a difference between the first code and the second code; a first encoding unit that encodes the second code; and a second encoding unit that encodes the difference calculated by the calculating unit.

BRIEF DESCRIPTION OF THE DRAWINGS

Exemplary embodiments of the present invention will be described in detail based on the following figures, wherein:

FIGS. 3A to 3D are explanatory illustrations each showing a processing example according to this exemplary embodiment;

FIGS. 4A to 4D are explanatory illustrations each showing a processing example according to this exemplary embodiment;

FIG. 5 is a conceptual module configuration diagram for a configuration example of a second exemplary embodiment;

FIG. 12 is a block diagram showing a hardware configuration example of a computer that implements any of the exemplary embodiments.

DETAILED DESCRIPTION

Exemplary embodiments desirable for implementing the invention are described below with reference to the drawings.

First Exemplary Embodiment

Figure 1:
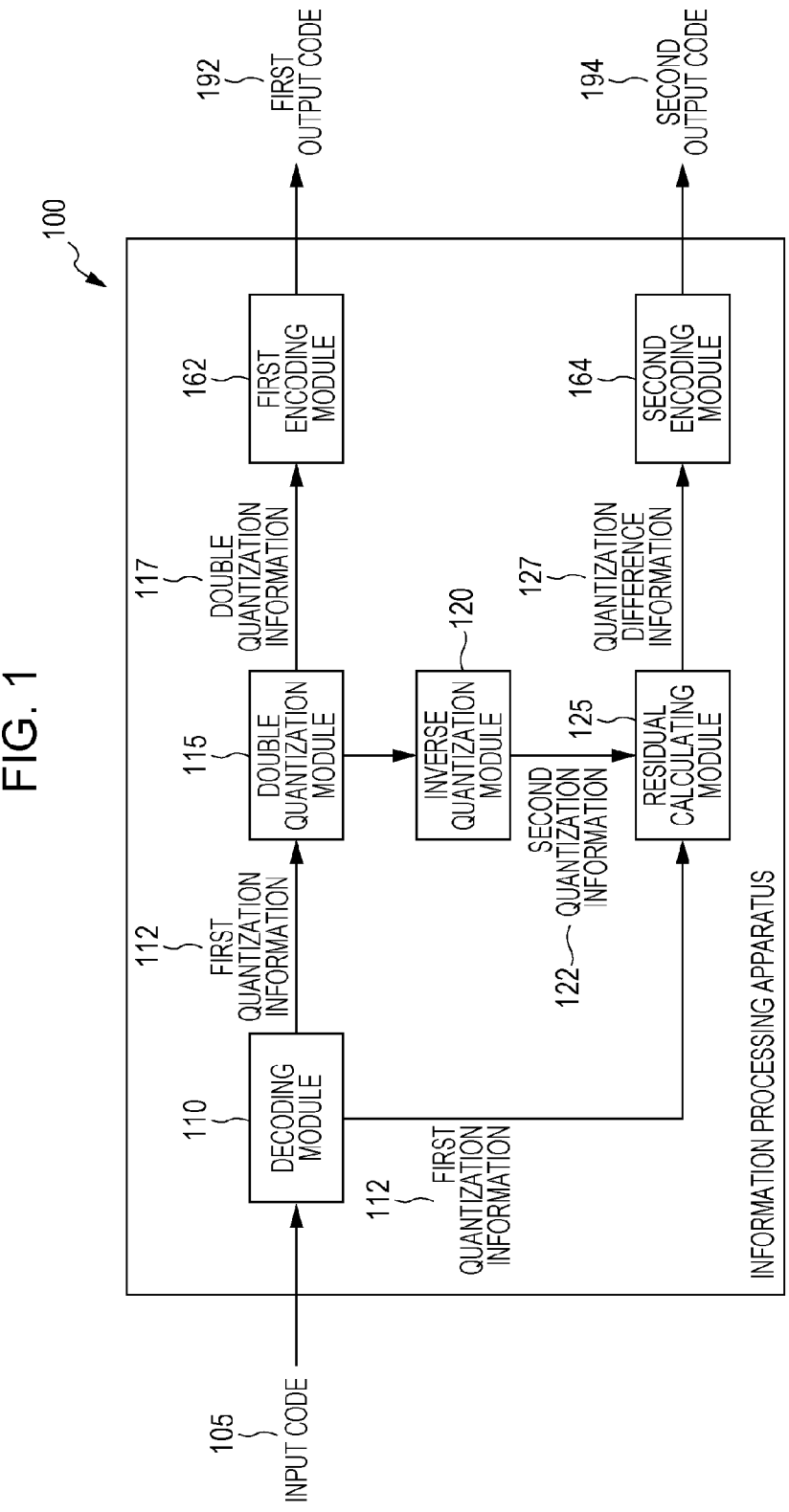
FIG. 1 is a conceptual module configuration diagram for a configuration example of a first exemplary embodiment.

FIG. 1 is a conceptual module configuration diagram for a configuration example of a first exemplary embodiment.

A module represents a component, such as software (a computer program) or hardware, which may be generally logically separated. Hence, a module in this exemplary embodiment represents not only a module being a computer program, but also a module being a hardware configuration. Therefore, description in this exemplary embodiment also involves a computer program that causes a computer to function as such a module (a program that causes a computer to execute respective steps, a program that causes a computer to function as respective units, and a program that causes a computer to provide respective functions), a system, and a method. For convenience of description, wordings "store," "cause . . . to store," and other wordings equivalent thereto are used. These wordings represent causing a memory to store . . . or controlling a memory to store . . . in the case in which the exemplary embodiment is a computer program. Also, modules may correspond to functions one by one. However, when being mounted or installed, a single module may be formed of a single program, plural modules may be formed of a single program, or a single module may be formed of plural programs. Also, plural modules may be executed by a single computer, or a single module may be executed by plural computers in a distributed or parallel environment. A single module may include other module. Also, "connection" is used for physical connection, and logical connection (for example, transmission and reception of data, an instruction, or reference relationship among data). An expression "predetermined" represents being determined before target processing. The situation includes a situation before processing according to this exemplary embodiment is started, and a situation even after processing according to this exemplary embodiment is started as long as the situation is before target processing. In other words, the expression "predetermined" is used as being determined in accordance with the condition and state of the current situation, or the condition and state of the previous situation. If there are plural "predetermined values," the values may be different, or two or more values (of course, all the values) may be the same. Also, an expression "if A, do B" is used as "determining whether A or not, and doing B if it is determined as A," unless otherwise the determination whether A or not is not required.

Also, a system or an apparatus includes a case in which a system or an apparatus is formed of plural computers, hardware, plural devices, etc., connected by a communication measure such as a network (including communication connection in a one-to-one correspondence), and a case in which a system or an apparatus is provided by a single computer, hardware, a single device, etc. "An apparatus" and "a system" are used as mutually equivalent words. Of course, "a system" does not include a social "scheme" (social system) that is merely an artificial agreement.

Also, target information is read from a memory every processing of each module or every processing if plural steps of processing are executed in a module, and after the processing, the processing result is written out to the memory. Hence, the description of reading from the memory before the processing and writing out to the memory after the processing may be occasionally omitted. In this case, a memory may include a hard disk, a random access memory (RAM), an external storage medium, a memory arranged via a communication line, and a register in a central processing unit (CPU).

An information processing apparatus 100 according to this exemplary embodiment performs encoding. As shown in an example in FIG. 1, the information processing apparatus 100 includes a decoding module 110, a double quantization module 115, an inverse quantization module 120, a residual calculating module 125, a first encoding module 162, and a second encoding module 164. Alternatively, the information processing apparatus 100 may not include the decoding module 110. In this case, first quantization information 112 is input to the information processing apparatus 100, and the first quantization information 112 is input to the double quantization module 115 and the residual calculating module 125. Also, a decoding device corresponding to the information processing apparatus 100 is equivalent to a decoding device of related art.

The information processing apparatus 100 may be more particularly applied to encoding of a compression parameter. Further, the information processing apparatus 100 may be applied to a compression parameter that uses two pieces of information (quotient and reminder of division).

The decoding module 110 is connected with the double quantization module 115 and the residual calculating module 125. The decoding module 110 receives an input code 105, and gives the first quantization information 112 to the double quantization module 115 and the residual calculating module 125. The decoding module 110 decodes the input code 105, and generates the first quantization information 112. The input code 105 has been already quantized and encoded. Quantization and encoding performed on the input code 105 may be any quantization method and any encoding method. The code may be any of a variable-length code and a fixed-length code.

Also, the decoding module 110 performs only decoding for entropy encoding, and do not perform, for example, inverse quantization or inverse transform.

The double quantization module 115 is connected with the decoding module 110, the inverse quantization module 120, and the first encoding module 162. The double quantization module 115 receives the first quantization information 112 from the decoding module 110, and gives double quantization information 117 to the first encoding module 162. The double quantization module 115 further quantizes (double quantizes) the quantized first quantization information 112, and hence generates the double quantization information 117. It is assumed that a coefficient that is applied in this case (hereinafter, also referred to as quantization parameter) is predetermined.

The inverse quantization module 120 is connected with the double quantization module 115 and the residual calculating module 125. The inverse quantization module 120 gives second quantization information 122 to the residual calculating module 125. The inverse quantization module 120 inversely quantizes the double quantization information 117 quantized by the double quantization module 115, and hence generates second quantization information 122. Inverse quantization used in this case is inverse processing for quantization performed by the double quantization module 115.

The residual calculating module 125 is connected with the decoding module 110, the inverse quantization module 120, and the second encoding module 164. The residual calculating module 125 receives the first quantization information 112 from the decoding module 110 and the second quantization information 122 from the inverse quantization module 120, and gives quantization difference information 127 to the second encoding module 164. The residual calculating module 125 calculates the difference between the first quantization information 112 and the second quantization information 122, and generates quantization difference information 127. At this time, the quantization difference information 127 is calculated for a quantization coefficient of the first quantization information 112 as a unit.

The first encoding module 162 is connected with the double quantization module 115. The first encoding module 162 receives the double quantization information 117 from the double quantization module 115, and outputs a first output code 192. The first encoding module 162 encodes the double quantization information 117 quantized by the double quantization module 115, and hence generates the first output code 192.

The second encoding module 164 is connected with the residual calculating module 125. The second encoding module 164 receives the quantization difference information 127 from the residual calculating module 125, and outputs a second output code 194. The second encoding module 164 encodes the quantization difference information 127 calculated by the residual calculating module 125, and hence generates the second output code 194.

Figure 2:
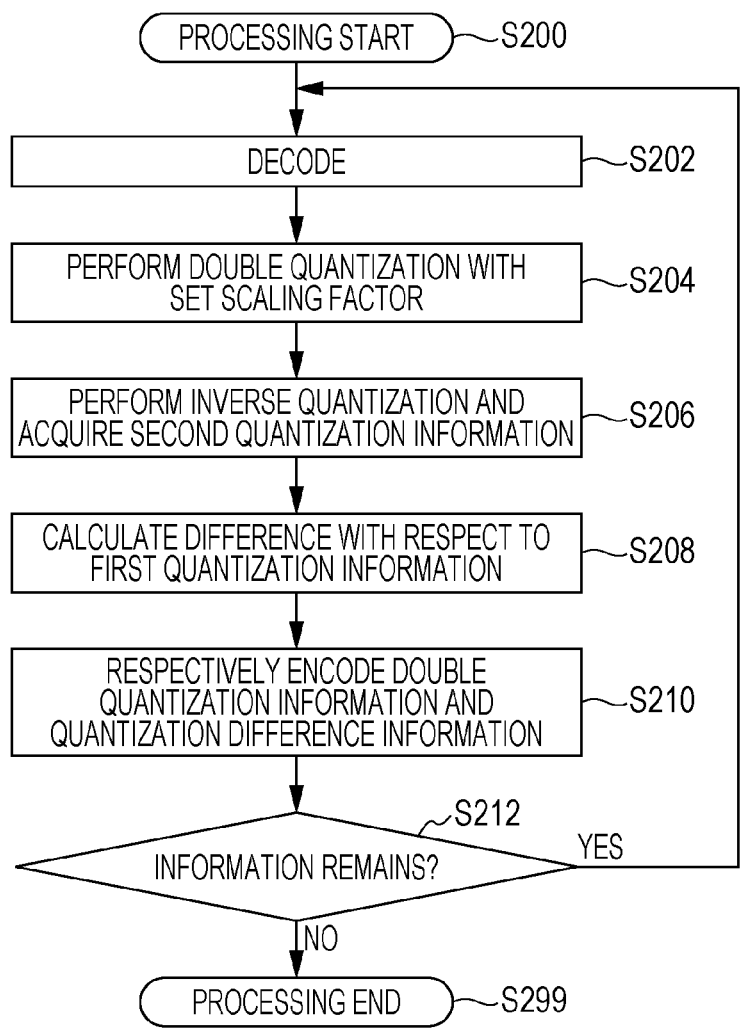
FIG. 2 is a flowchart showing a processing example according to the first exemplary embodiment.

FIG. 2 is a flowchart showing a processing example according to the first exemplary embodiment. In step S200, the processing is started.

In step S202, the decoding module 110 decodes the input code 105 and generates the first quantization information 112.

In step S204, the double quantization module 115 performs double quantization with a set scaling factor, and hence generates the double quantization information 117.

In step S206, the inverse quantization module 120 performs inverse quantization, and hence generates the second quantization information 122.

In step S208, the residual calculating module 125 calculates the difference between the first quantization information 112 and the second quantization information 122.

In step S210, the first encoding module 162 and the second encoding module 164 respectively encode the double quantization information 117 and the quantization difference information 127.

In step S212, it is determined whether information to be encoded remains or not. If information to be encoded remains, the processing goes to step S202. Otherwise, the processing is ended (step S299).

A technical meaning according to this exemplary embodiment is described with reference to examples in FIGS. 3A to 3D. This description is given for easier understanding of this exemplary embodiment, and hence is conceptual description.

The image quality has multiple aspects, and representative aspects are resolution and tone. In each of graphs shown in examples in FIGS. 3A to 3D, the horizontal axis plots the frequency and the vertical axis plots the tone. That is, each example shows the frequency and the tone as mutually independent axes. It is assumed that the information amount of an original image (an image before quantization (encoding)) is an original image 300 shown in the example in FIG. 3A. Of course, since the original image 300 is an image before quantization, no information is lost for the frequency or tone.

When JPEG compression is applied to the original image 300, as shown in the example in FIG. 3B, the information amount after compression (or an image decoded from the compressed image) becomes JPEG information 320. As compared with the original image 300, disappearing information 310 is information lost by quantization. That is, in a case of JPEG compression, only the axis of the frequency (resolution) is scalable. Hence, JPEG compression which is related art for scaling only with the frequency may not control the tone. The information lost by quantization of the tone is not interpolated later. However, if compression is performed not to lose information, the entire compression ratio is decreased.

When an image processing apparatus is configured such that image information is divided along independent plural axes so that the divided image information may be additionally decompressed, as shown in the example in FIG. 3C, the frequency and tone may be desirably selected at decompression.

Accordingly, only information required for a user may be acquired for each axis. Also, the transmission time of an image may be decreased.

To be specific, in a case of a mobile terminal (or a color correction processor) etc. with a small screen, to reproduce an image with a high tone and a low frequency, for example, divided information 332, divided information 342, and divided information 352 shown in FIG. 3C are received and decompressed. This is a case in which high-frequency information is omitted under the limitation of the resolution of the mobile terminal etc. Also, in a case of a recognition processor or a presentation terminal (or a character recognizing device) etc., to reproduce an image with a low tone and a high frequency, for example, divided information 352, divided information 354, and divided information 356 shown in FIG. 3C are transmitted. In this case, high-tone information is omitted under the limitation of the transmission time. Also, in a case of a matching device, to reproduce an image with a high tone and a high frequency, for example, divided information 332 to divided information 356 shown in FIG. 3C are transmitted. Herein, information equivalent to the original image is required. However, in this case, data which is not quantized is expected as an input, and processing on quantized data is not efficient. That is, processing may be performed if data is inversely quantized as input information; however, the quantization parameter may not be efficiently set (that is, the highest image quality may not be set equally to quantization of input information).

Owing to this, in this exemplary embodiment, to allow the user to efficiently acquire only required information even if quantization information is input, processing by each module is performed as shown in the example in FIG. 1. If the processing is performed, as shown in the example in FIG. 3D, the first output code 192 becomes divided information 372, divided information 374, and divided information 376; and the second output code 194 becomes divided information 362, divided information 364, and divided information 366. That is, by further performing quantization on input quantization information, the information is divided (into the group of the divided information 362, the divided information 364, and the divided information 366, and the group of the divided information 372, the divided information 374, and the divided information 376). Regarding the code, double quantization serves as quantization information and is superposed on the code.

A simple example for the theory of quantization according to this exemplary embodiment is described with reference to examples in FIGS. 4A to 4D.

For example, a code in which a value of 226 is quantized with a quantization parameter 8 becomes as follows.

226/8=28 (quantization result)

Hence, information of 28 is included (see FIG. 4A). If the value is inversely quantized, the value becomes as follows.

28×8=224

In related art, it is assumed that 224 is divided by 6-time quantization. At this time, a compression parameter A and a compression parameter B are respectively 48 and 1, and become as follows (see FIG. 4C).

224/48=4 with the remainder of 32

In this case, "4" and "32" are sent out as codes.

However, since this information has been quantized with 8, the precision of the second code is too high.

In this exemplary embodiment, double quantization is performed instead of inverse quantization. In the above-described example, double quantization may be performed by multiplication of 6, and hence the quantization result is further divided by 6. Then, the result is as follows (see FIG. 4D).

28/6=4 (quantization result with 48 being the coefficient) with the remainder of 4 (quantization result with 8 being the coefficient).

Hence, "4" and "4" are sent out as codes.
If this is decoded, the result is as follows.

4×48+4×8=192+32=224

Accordingly, it is found that the original information is encoded.

Second Exemplary Embodiment

FIG. 5 is a conceptual module configuration diagram for a configuration example of a second exemplary embodiment. To be specific, a discrete cosine transform (DCT) coefficient is encoded into a first output code 592 and a second output code 594.

An information processing apparatus 500 includes a Huffman decoding module 510, a double quantization module 115, an inverse quantization module 120, a residual calculating module 125, a first Huffman encoding module 562, and a second Huffman encoding module 564. As compared with the first exemplary embodiment, the second exemplary embodiment has a configuration in which the decoding module 110 is embodied as the Huffman decoding module 510, the first encoding module 162 is embodied as the first Huffman encoding module 562, and the second encoding module 164 is embodied as the second Huffman encoding module 564. The same reference signs are applied to portions of the same kinds to those of the above-described exemplary embodiment, and the description thereof is omitted (this will be applied to the other embodiments).

The Huffman decoding module 510 is connected with the double quantization module 115 and the residual calculating module 125. The Huffman decoding module 510 receives an input code 505. The Huffman decoding module 510 performs Huffman decoding processing on the input code 505. Of course, the input code 505 has been applied with Huffman encoding processing.

The double quantization module 115 is connected with the Huffman decoding module 510, the inverse quantization module 120, and the first Huffman encoding module 562.

The inverse quantization module 120 is connected with the double quantization module 115 and the residual calculating module 125.

The residual calculating module 125 is connected with the Huffman decoding module 510, the inverse quantization module 120, and the second Huffman encoding module 564.

The first Huffman encoding module 562 is connected with the double quantization module 115. The first Huffman encoding module 562 outputs the first output code 592. The first Huffman encoding module 562 applies Huffman encoding processing on double quantization information which is a processing result by the double quantization module 115, and hence generates the first output code 592.

The second Huffman encoding module 564 is connected with the residual calculating module 125. The second Huffman encoding module 564 outputs the second output code 594. The second Huffman encoding module 564 applies Huffman encoding processing on quantization difference information which is a processing result by the residual calculating module 125, and hence generates the second output code 594.

An example shown in part (A) of FIG. 5 is a DCT coefficient before quantization of the input code 505.

An example shown in part (B) of FIG. 5 is an input quantization table (second output quantization table) as the input code 505.

An example shown in part (G) of FIG. 5 is a double quantization table (first output quantization table).

An example shown in part (C) of FIG. 5 is a processing result by the Huffman decoding module 510.

An example shown in part (D) of FIG. 5 is a processing result by the double quantization module 115.

An example shown in part (E) of FIG. 5 is a processing result by the inverse quantization module 120.

An example shown in part (F) of FIG. 5 is a processing result by the residual calculating module 125.

A processing example by the double quantization module 115 is described with reference to the example shown in part (D) of FIG. 5.

In the expression written below is calculated by rounding down to meet the standard of JPEG. However, the calculation may theoretically employ rounding up on 5 and rounding down on 4.

$$28 \times 8/16 = 14 \quad \text{Expression (1)}$$

$$15 \times 6/32 = 2 \quad \text{Expression (2)}$$

Herein, "28" in Expression (1) is a value in the first line in a subject 599C in part (C) of FIG. 5, "8" in Expression (1) is a value in the first line in a subject 599B in part (B) of FIG. 5, "16" in Expression (1) is a value in the first line in a subject 599G in part (G) of FIGS. 5, and "14" in Expression (1) is a value in the first line in a subject 599D in part (D) of FIG. 5.

Figure 6:
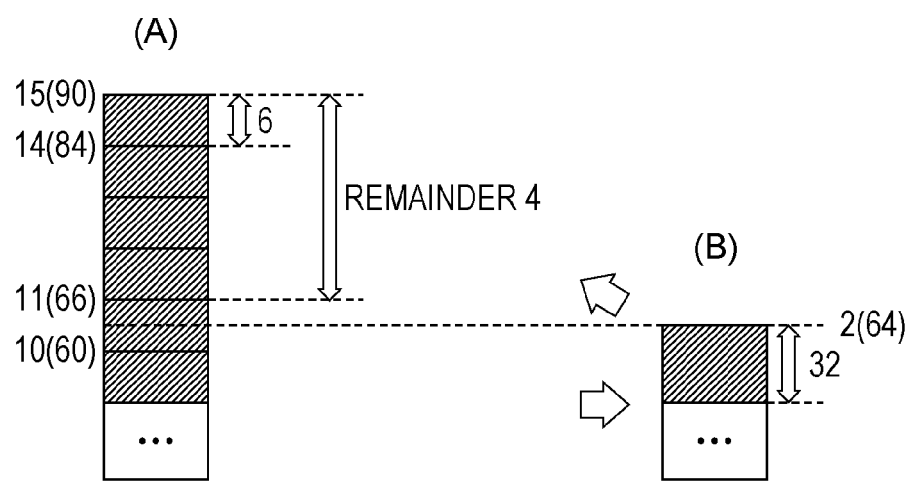
FIG. 6 is an explanatory illustration showing a processing example according to the second exemplary embodiment.

Also, "15" in Expression (2) is a value in the second line in the subject 599C in part (C) of FIG. 5, "6" in Expression (2) is a value in the second line in the subject 599B in part (B) of FIG. 5, "32" in Expression (2) is a value in the second line in the subject 599G in part (G) of FIG. 5, and "2" in Expression (2) is a value in the second line in the subject 599D in part (D) of FIG. 5 (see part (A) and part (B) of FIG. 6).

A processing example by the inverse quantization module 120 is described with reference to the example shown in part (E) of FIG. 5.

Inverse quantization is performed for a quantization coefficient of the first quantization information as a unit. Since the residual is rounded down, calculation is performed by rounding up; however, may employ rounding up on 5 and rounding down on 4.

$$14 \times 16/8 = 28 \quad \text{Expression (3)}$$

$$2 \times 32/6 = 11 \quad \text{Expression (4)}$$

Herein, "14" in Expression (3) is the value in the first line in the subject 599D in part (D) of FIG. 5, "16" in Expression (3) is the value in the first line in the subject 599G in part (G) of FIG. 5, "8" in Expression (3) is the value in the first line in the subject 599B in part (B) of FIG. 5, and "28" in Expression (3) is a value in the first line in a subject 599E in part (E) of FIG. 5.

Also, "2" in Expression (4) is the value in the second line in the subject 599D in part (D) of FIG. 5, "32" in Expression (4) is the value in the second line in the subject 599G in part (G) of FIG. 5, "6" in Expression (4) is the value in the second line in the subject 599B in part (B) of FIG. 5, and "11" in Expression (4) is a value in the second line in the subject 599E in part (E) of FIG. 5.

A processing example by the residual calculating module 125 is described with reference to the example shown in part (F) of FIG. 5.

The residual is calculated for a quantization coefficient of the first quantization information as a unit.

$$28 - 28 = 0 \quad \text{Expression (5)}$$

$$15 - 11 = 4 \quad \text{Expression (6)}$$

Herein, former "28" in Expression (5) is the value in the first line in the subject 599C in part (C) of FIG. 5, latter "28" in Expression (5) is the value in the first line in the subject 599E in part (E) of FIG. 5, and "0" in Expression (5) is a value in the first line in a subject 599F in part (F) of FIG. 5.

Also, "15" in Expression (6) is the value in the second line in the subject 599C in part (C) of FIG. 5, "11" in Expression (6) is the value in the second line in the subject 599E in part (E) of FIG. 5, and "4" in Expression (6) is a value in the second line in the subject 599F in part (F) of FIG. 5.

Alternatively, for another processing example, inverse quantization may calculate the original value, and the residual may be calculated for a coefficient of first quantization as a unit.

The residual calculated by normal inverse quantization is calculated for a quantization coefficient of first quantization information as a unit.

$$(28 \times 8 - 14 \times 16)/8 = 0 \quad \text{Expression (7)}$$

$$(15 \times 6 - 2 \times 32)/6 = 4 \quad \text{Expression (8)}$$

Herein, "28" in Expression (7) is the value in the first line in the subject 599C in part (C) of FIG. 5, "8" in Expression (7) is the value in the first line in the subject 599B in part (B) of FIG. 5, "14" in Expression (7) is the value in the first line in the subject 599D in part (D) of FIG. 5, "16" in Expression (7) is the value in the first line in the subject 599G in part (G) of FIG. 5, and "0" in Expression (7) is the value in the first line in the subject 599F in part (F) of FIG. 5.

Also, "15" in Expression (8) is the value in the second line in the subject 599C in part (C) of FIG. 5, "6" in Expression (8) is the value in the second line in the subject 599B in part (B) of FIG. 5, "2" in Expression (8) is the value in the second line in the subject 599D in part (D) of FIG. 5, "32" in Expression (8) is the value in the second line in the subject 599G in part (G) of FIG. 5, and "4" in Expression (8) is the value in the second line in the subject 599F in part (F) of FIG. 5.

Third Exemplary Embodiment

Figure 7:
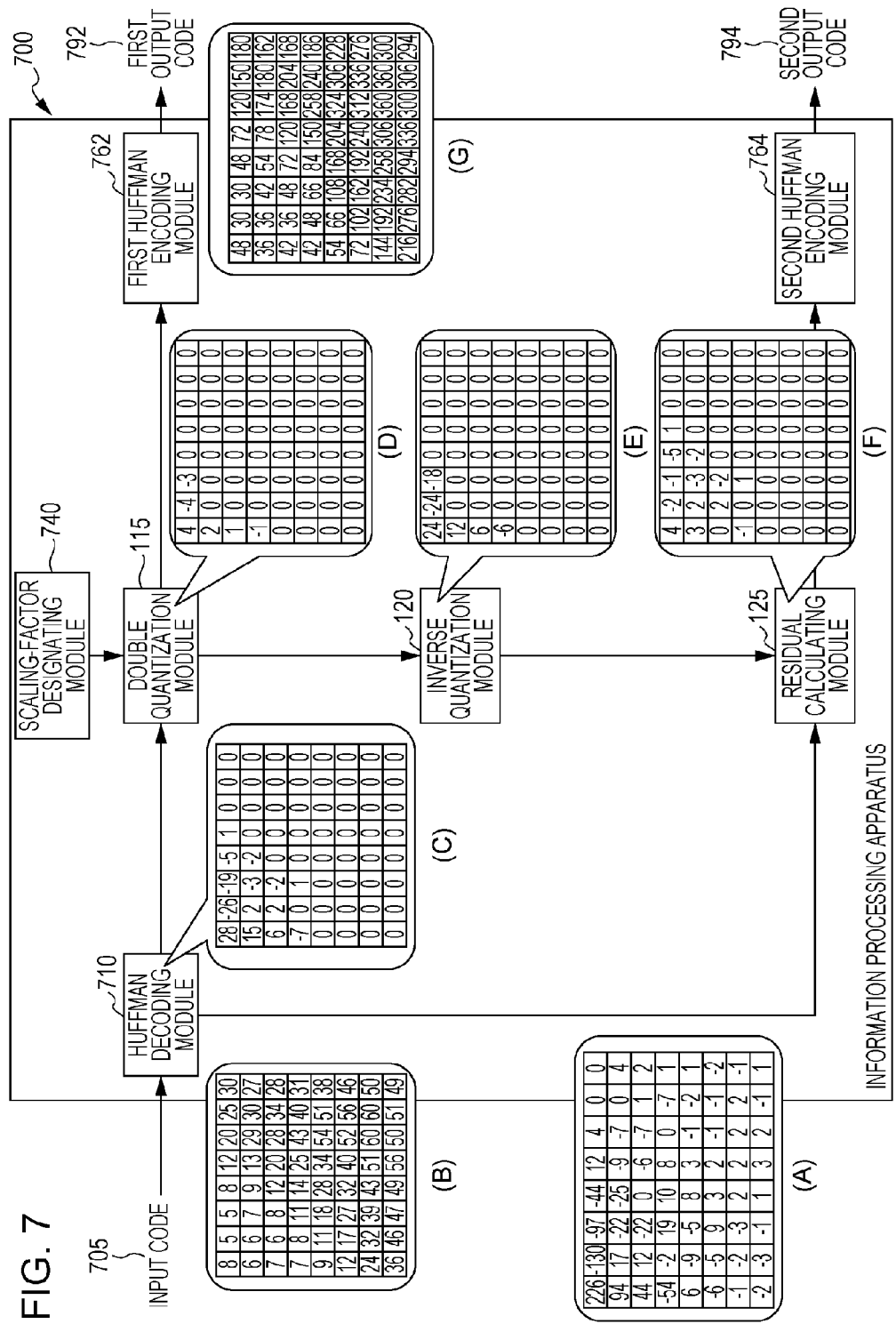
FIG. 7 is a conceptual module configuration diagram for a configuration example of a third exemplary embodiment.

FIG. 7 is a conceptual module configuration diagram for a configuration example of a third exemplary embodiment.

An information processing apparatus 700 includes a Huffman decoding module 710, a scaling-factor designating module 740, a double quantization module 115, an inverse quantization module 120, a residual calculating module 125, a first Huffman encoding module 762, and a second Huffman encoding module 764. The third exemplary embodiment has a configuration in which the scaling-factor designating module 740 is added to the second exemplary embodiment.

The Huffman decoding module 710 is connected with the double quantization module 115 and the residual calculating module 125. The Huffman decoding module 710 receives an input code 705. The Huffman decoding module 710 performs processing equivalent to that of the Huffman decoding module 510.

The scaling-factor designating module 740 is connected with the double quantization module 115. The scaling-factor designating module 740 designates a coefficient for quantization by the double quantization module 115 as a relative value. For example, a scaling factor of N-times (N being an integer of 1 or larger) is designated for first quantization information. Since the coefficient of quantization is designated with a relative value instead of an absolute value, the trend of division may be designated regardless of the intensity of quantization of input information.

The double quantization module 115 is connected with the Huffman decoding module 710, the scaling-factor designating module 740, the inverse quantization module 120, and the first Huffman encoding module 762. The double quantization module 115 further performs quantization (double quantization) according to the coefficient designated by the scaling-factor designating module 740.

The inverse quantization module 120 is connected with the double quantization module 115 and the residual calculating module 125.

The residual calculating module 125 is connected with the Huffman decoding module 710, the inverse quantization module 120, and the second Huffman encoding module 764.

The first Huffman encoding module 762 is connected with the double quantization module 115. The first Huffman encoding module 762 outputs a first output code 792. The first Huffman encoding module 762 performs processing equivalent to that of the first Huffman encoding module 562.

The second Huffman encoding module 764 is connected with the residual calculating module 125. The second Huffman encoding module 764 outputs a second output code 794. The second Huffman encoding module 764 performs processing equivalent to that of the second Huffman encoding module 564.

An example shown in part (A) of FIG. 7 is a DCT coefficient before quantization of an input code 705.

An example shown in part (B) of FIG. 7 is an input quantization table (second output quantization table) as the input code 705.

An example shown in part (G) of FIG. 7 is a double quantization table (first output quantization table).

An example shown in part (C) of FIG. 7 is a processing result by the Huffman decoding module 710.

An example shown in part (D) of FIG. 7 is a processing result by the double quantization module 115.

An example shown in part (E) of FIG. 7 is a processing result by the inverse quantization module 120.

An example shown in part (F) of FIG. 7 is a processing result by the residual calculating module 125.

A processing example by the Huffman decoding module 710 is described with reference to the example shown in part (C) of FIG. 7.

The first quantization information which is the processing result by the Huffman decoding module 710 is obtained by quantizing the DCT coefficient according to the input quantization table. For example, a value at the upper left is as follows.

226/8=28

A processing example by the double quantization module 115 is described with reference to the example shown in part (D) of FIG. 7. It is assumed that the designated scaling factor by the scaling-factor designating module 740 is 6 times.

Double quantization information which is a processing result by the double quantization module 115 is obtained by performing double quantization on the quantization information with the designated scaling factor of 6. The calculation is an example by rounding down; however, calculation by rounding up on 5 and rounding down on 4 may be performed. For example, a value at the upper left is as follows.

28/6=4

A processing example by the inverse quantization module 120 is described with reference to the example shown in part (E) of FIG. 7.

Second quantization information which is a processing result by the inverse quantization module 120 is a result of inverse quantization with the designated scaling factor of 6. For example, a value at the upper left is as follows.

4×6=24

A processing example by the residual calculating module 125 is described with reference to the example shown in part (F) of FIG. 7.

Quantization difference information which is a processing result by the residual calculating module 125 is a calculation result of "the first quantization information"−"the second quantization information." For example, a value at the upper left is as follows.

28−24=4

Figure 8:
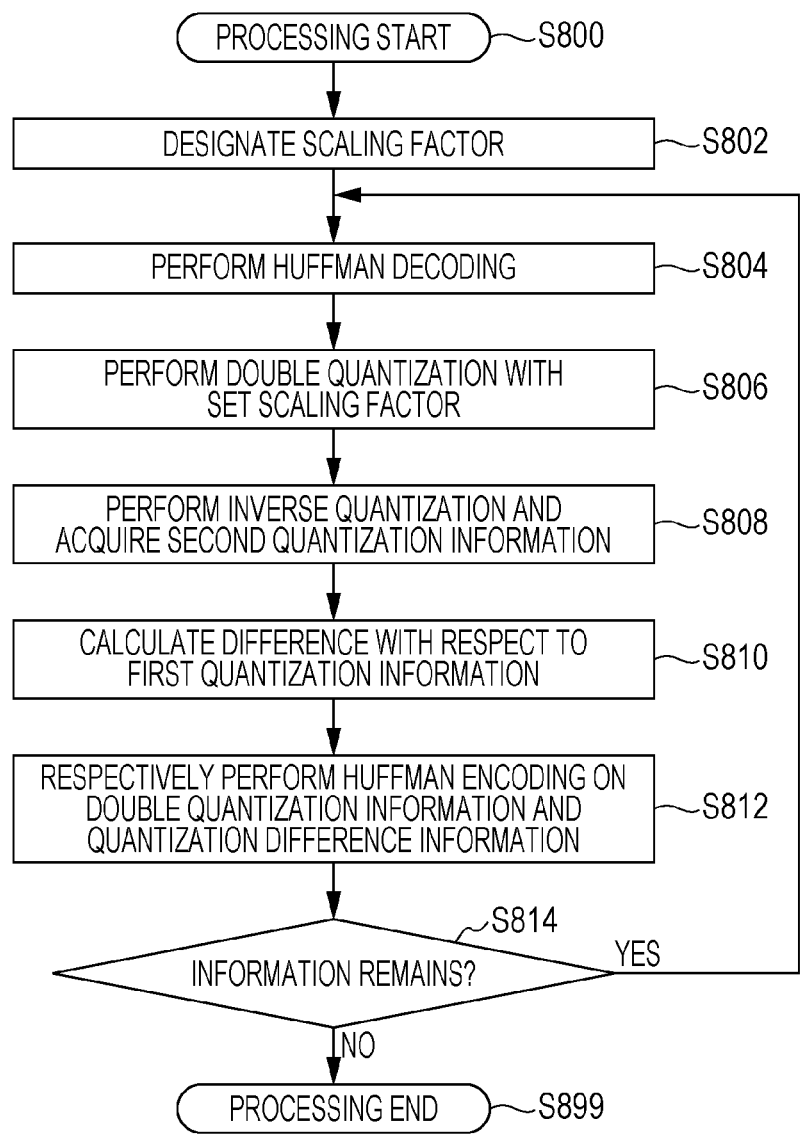
FIG. 8 is a flowchart showing a processing example according to the third exemplary embodiment.

FIG. 8 is a flowchart showing a processing example according to the third exemplary embodiment. In step 800, the processing is started.

In step S802, the scaling-factor designating module 740 designates a scaling factor.

In step S804, the Huffman decoding module 710 performs Huffman decoding.

In step S806, the double quantization module 115 performs double quantization with the set scaling factor.

In step S808, the inverse quantization module 120 performs inverse quantization, and hence acquires the second quantization information.

In step S810, the residual calculating module 125 calculates the difference with respect to the first quantization information.

In step S812, the first Huffman encoding module 762 and the second Huffman encoding module 764 respectively perform Huffman encoding on the double quantization information and the quantization difference information.

In step S814, it is determined whether information remains or not. If information remains, the processing goes to step S804. Otherwise, the processing is ended (step S899).

Fourth Exemplary Embodiment

Figure 9:
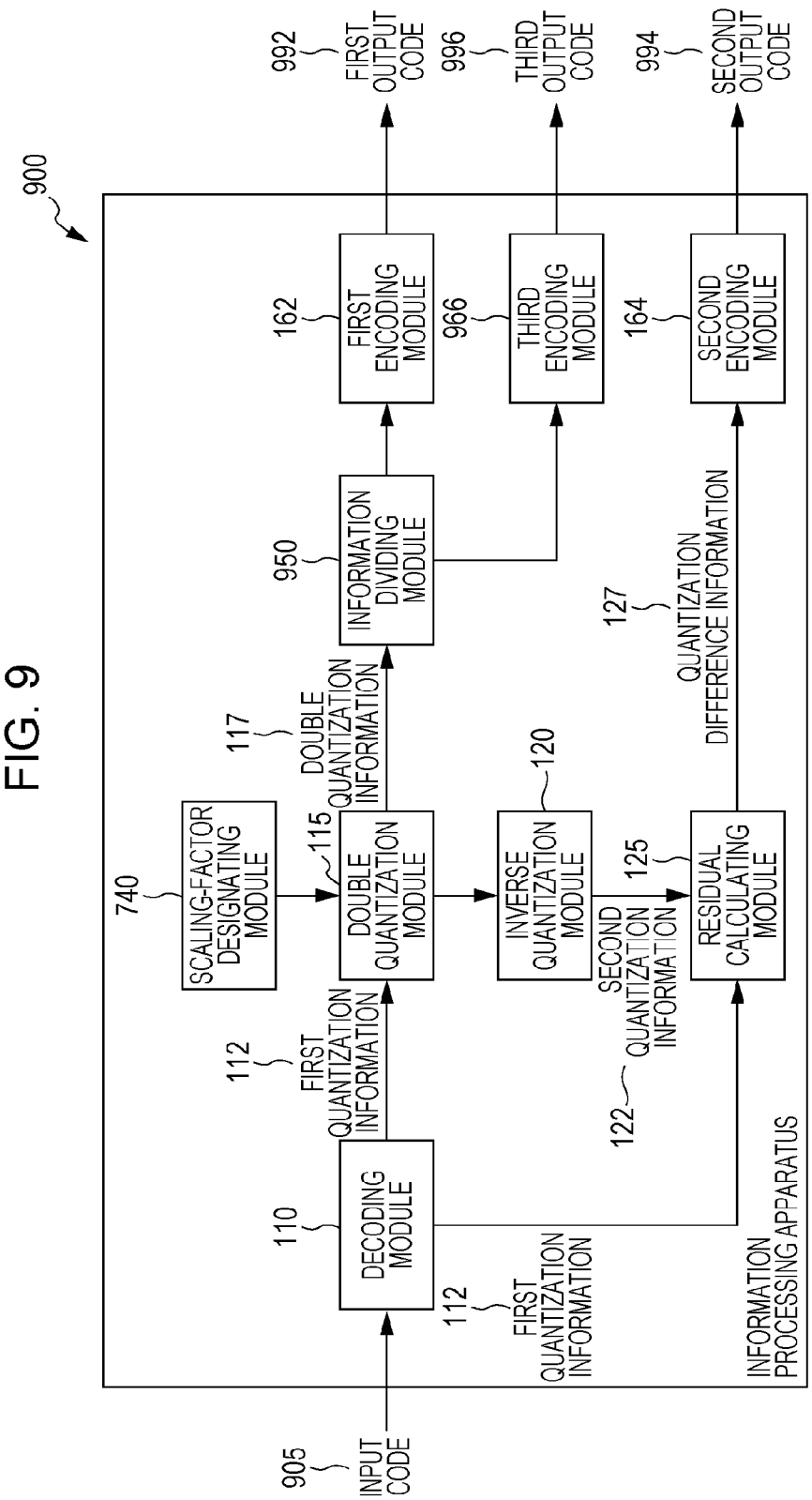
FIG. 9 is a conceptual module configuration diagram for a configuration example of a fourth exemplary embodiment.

FIG. 9 is a conceptual module configuration diagram for a configuration example of a fourth exemplary embodiment.

An information processing apparatus 900 includes a decoding module 110, a scaling-factor designating module 740, a double quantization module 115, an inverse quantization module 120, a residual calculating module 125, an information dividing module 950, a first encoding module 162, a second encoding module 164, and a third encoding module 966. The fourth exemplary embodiment has a configuration in which the scaling-factor designating module 740, the information dividing module 950, and the third encoding module 966 are added to the first exemplary embodiment.

The decoding module 110 is connected with the double quantization module 115 and the residual calculating module 125. The decoding module 110 receives an input code 905, and gives first quantization information 112 to the residual calculating module 125.

The scaling-factor designating module 740 is connected with the double quantization module 115.

The double quantization module 115 is connected with the decoding module 110, the scaling-factor designating module 740, the inverse quantization module 120, and the information dividing module 950. The double quantization module 115 receives the first quantization information 112 from the decoding module 110, and gives double quantization information 117 to the information dividing module 950.

The inverse quantization module 120 is connected with the double quantization module 115 and the residual calculating module 125. The inverse quantization module 120 gives second quantization information 122 to the residual calculating module 125.

The residual calculating module 125 is connected with the decoding module 110, the inverse quantization module 120, and the second encoding module 164. The residual calculating module 125 receives the first quantization information 112 from the decoding module 110 and the second quantization information 122 from the inverse quantization module 120, and gives quantization difference information 127 to the second encoding module 164.

The information dividing module 950 is connected with the double quantization module 115, the first encoding module 162, and the third encoding module 966. The information dividing module 950 receives the double quantization information 117 from the double quantization module 115. The information dividing module 950 divides the double quantization information 117. The double quantization information 117 is divided along a predetermined axis. For example, the information is divided according to the resolution, spatial position, tone, and so forth. A portion which is lost by the division is interpolated with a 0 value.

The third encoding module 966 is connected with the information dividing module 950. The third encoding module 966 outputs a third output code 996. The third encoding module 966 encodes one code divided by the information dividing module 950, and hence generates the third output code 996.

The first encoding module 162 is connected with the information dividing module 950. The first encoding module 162 outputs a first output code 992. The first encoding module 162 encodes the other code divided by the information dividing module 950, and hence generates the first output code 992.

The second encoding module 164 is connected with the residual calculating module 125. The second encoding module 164 receives the quantization difference information 127 from the residual calculating module 125, and outputs a second output code 994.

Figure 10:
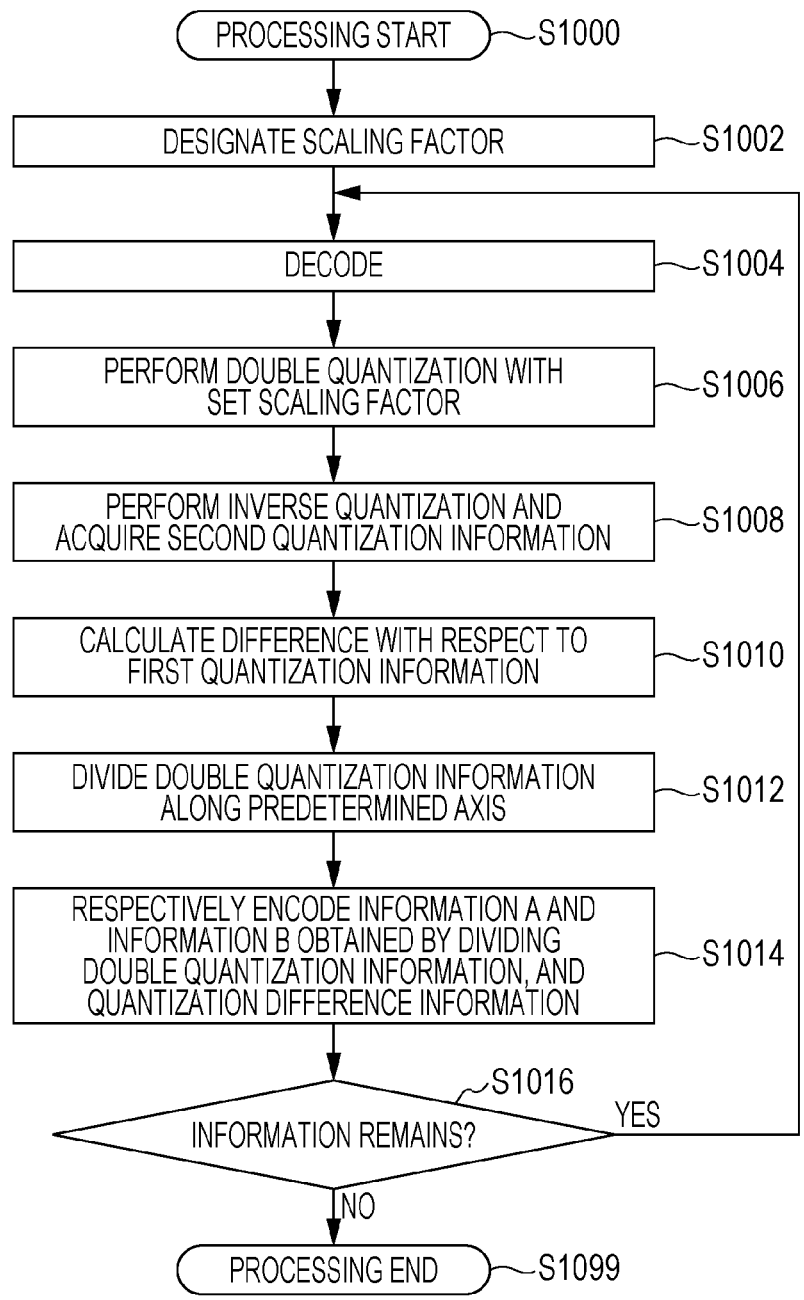
FIG. 10 is a flowchart showing a processing example according to the fourth exemplary embodiment.

FIG. 10 is a flowchart showing a processing example according to the fourth exemplary embodiment. In step S1000, the processing is started.

In step S1002, the scaling-factor designating module 740 designates a scaling factor.

In step S1004, the decoding module 110 performs decoding.

In step S1006, the double quantization module 115 performs double quantization with the set scaling factor.

In step S1008, the inverse quantization module 120 performs inverse quantization, and hence acquires the second quantization information.

In step S1010, the residual calculating module 125 calculates the difference with respect to the first quantization information.

In step S1012, the information dividing module 950 divides the double quantization information 117 along a predetermined axis.

In step S1014, the first encoding module 162, the third encoding module 966, and the second encoding module 164 respectively encode information A and information B obtained by dividing the double quantization information 117, and the quantization difference information 127.

In step S1016, it is determined whether information remains or not. If information remains, the processing goes to step S1004. Otherwise, the processing is ended (step S1099).

Fifth Exemplary Embodiment

Figure 11:
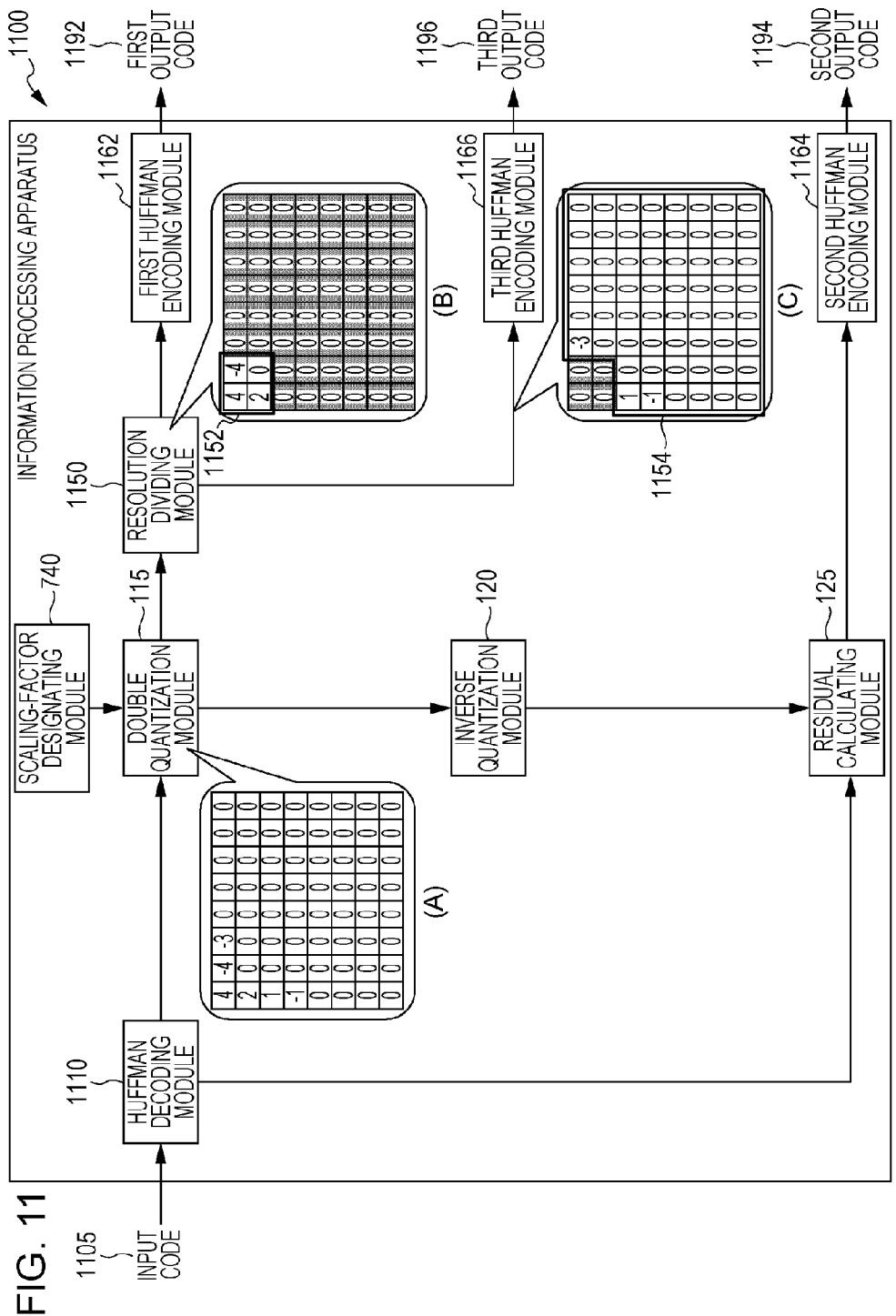
FIG. 11 is a conceptual module configuration diagram for a configuration example of a fifth exemplary embodiment.

FIG. 11 is a conceptual module configuration diagram for a configuration example of a fifth exemplary embodiment. To be specific, a DCT coefficient is encoded into a first output code 1192, a second output code 1194, and a third output code 1196.

An information processing apparatus 1100 includes a Huffman decoding module 1110, a scaling-factor designating module 740, a double quantization module 115, an inverse quantization module 120, a residual calculating module 125, a resolution dividing module 1150, a first Huffman encoding module 1162, a second Huffman encoding module 1164, and a third Huffman encoding module 1166. As compared with the fourth exemplary embodiment, the fifth exemplary embodiment has a configuration in which the decoding module 110 is embodied as the Huffman decoding module 1110, the information dividing module 950 is embodied as the resolution dividing module 1150, the first encoding module 162 is embodied as the first Huffman encoding module 1162, the second encoding module 164 is embodied as the second Huffman encoding module 1164, and the third encoding module 966 is embodied as the third Huffman encoding module 1166.

The Huffman decoding module 1110 is connected with the double quantization module 115 and the residual calculating module 125. The Huffman decoding module 1110 receives an input code 1105. The Huffman decoding module 1110 performs Huffman decoding processing on the input code 1105. Of course, the input code 1105 has been applied with Huffman encoding processing.

The scaling-factor designating module 740 is connected with the double quantization module 115.

The double quantization module 115 is connected with the Huffman decoding module 1110, the scaling-factor designating module 740, the inverse quantization module 120, and the resolution dividing module 1150.

The inverse quantization module 120 is connected with the double quantization module 115 and the residual calculating module 125.

The residual calculating module 125 is connected with the Huffman decoding module 1110, the inverse quantization module 120, and the second Huffman encoding module 1164.

The resolution dividing module 1150 is connected with the double quantization module 115, the first Huffman encoding module 1162, and the third Huffman encoding module 1166. The resolution dividing module 1150 performs division along the axis of the frequency (resolution).

The first Huffman encoding module 1162 is connected with the resolution dividing module 1150. The first Huffman encoding module 1162 outputs the first output code 1192. The first Huffman encoding module 1162 applies Huffman encoding processing on one processing result by the resolution dividing module 1150, and hence generates the first output code 1192.

The second Huffman encoding module 1164 is connected with the residual calculating module 125. The second Huffman encoding module 1164 outputs the second output code 1194. The second Huffman encoding module 1164 applies Huffman encoding processing on quantization difference information which is a processing result by the residual calculating module 125, and hence generates the second output code 1194.

The third Huffman encoding module 1166 is connected with the resolution dividing module 1150. The third Huffman encoding module 1166 outputs the third output code 1196. The third Huffman encoding module 1166 applies Huffman encoding processing on the other processing result by the resolution dividing module 1150, and hence generates the third output code 1196.

An example shown in part (A) of FIG. 11 is a processing result by the double quantization module 115.

An example shown in part (B) of FIG. 11 is one processing result obtained by dividing the example shown in part (A) of FIG. 11 by the resolution dividing module 1150 (processing result to be input to the first Huffman encoding module 1162).

An example shown in part (C) of FIG. 11 is the other processing result obtained by dividing the example shown in part (A) of FIG. 11 by the resolution dividing module 1150 (processing result to be input to the third Huffman encoding module 1166).

The resolution dividing module 1150 divides the example shown in part (A) of FIG. 11 into a divided region 1152 and a divided region 1154 along the axis of the frequency. That is, in the example in part (B) of FIG. 11, the inside of the divided region 1152 is the same as the example shown in part (A) of FIG. 11. However, a portion other than the divided region 1152 (a portion corresponding to the divided region 1154) is replaced with a 0 value. In contrast, in the example in part (C) of FIG. 11, the inside of the divided region 1154 is the same as the example shown in part (A) of FIG. 11. However, a portion other than the divided region 1154 (a portion corresponding to the divided region 1152) is replaced with a 0 value.

In general, when an image is divided, the information amount increases. A dividing method to suppress an increase in the information amount is described below. When an event is a binding event of a and b, an information amount I(a, b) is developed as shown in Expression (9).

$$p(a, b) = p(a)p(b \mid a) \quad \text{Expression (9)}$$

$$I(a, b) = \sum_{a,b} p(a, b)\log p(a, b)$$
$$= \sum_{a,b} p(a)p(b \mid a)\log(p(a)p(b \mid a))$$
$$= \sum_{a,b} p(a)p(b \mid a)(\log p(a) + \log p(b \mid a))$$
$$= \sum_{a} p(a)\log p(a) + \sum_{a,b} p(a)p(b \mid a)\log p(b \mid a)$$
$$= I(a) + \sum_{a} p(a)I(b \mid a)$$

That is, if a and b are independent events, I(a, b) may be divided into the information amount of a and the information amount of b (without an increase).

Hence, if the first division and the second division according to this exemplary embodiment are configured so that the divided results are respectively independent events, the above-described increase in the information amount is not present. In this exemplary embodiment, the above-described double quantization information and quantization difference information are expected to be independent events.

Referring to FIG. 12, a hardware configuration example of the information processing apparatus according to any of the exemplary embodiments is described. The configuration shown in FIG. 12 is formed of, for example, a personal computer (PC), and is a hardware configuration example including a data reading unit 1217 such as a scanner, and a data output unit 1218 such as a printer.

A central processing unit (CPU) 1201 is a controller that executes processing according to a computer program having written therein execution sequences of the respective modules described in the exemplary embodiments. In particular, the respective modules include the decoding module 110, the double quantization module 115, the inverse quantization module 120, the residual calculating module 125, the first encoding module 162, the second encoding module 164, the Huffman decoding module 510, the first Huffman encoding module 562, the second Huffman encoding module 564, the Huffman decoding module 710, the scaling-factor designating module 740, the first Huffman encoding module 762, the second Huffman encoding module 764, the information dividing module 950, the third encoding module 966, the Huffman decoding module 1110, the resolution dividing module 1150, the first Huffman encoding module 1162, the second Huffman encoding module 1164, and the third Huffman encoding module 1166.

A read only memory (ROM) 1202 stores a program, an operation parameter, etc., used by the CPU 1201. A random access memory (RAM) 1203 stores a program used during the execution by the CPU 1201, a parameter that is properly changed during the execution, etc. The CPU 1201, the ROM 1202, and the RAM 1203 are mutually connected through a host bus 1204 formed of, for example, a CPU bus.

The host bus 1204 is connected to an external bus 1206 such as a peripheral component interconnect/interface (PCI) bus through a bridge 1205.

A keyboard 1208 and a pointing device 1209 such as a mouse are input devices that are operated by an operator. A display 1210 is a liquid crystal display device, a cathode ray tube (CRT), or the like, and displays various information as text and image information.

A hard disk drive (HDD) 1211 includes a hard disk therein, drives the hard disk, and causes the hard disk to record or reproduce a program executed by the CPU 1201 and information. The hard disk stores, for example, the input code 105, the first quantization information 112, the double quantization information 117, the second quantization information 122, the quantization difference information 127, the first output code 192, and the second output code 194. Further, the hard disk stores various computer programs such as other various data processing programs.

A drive 1212 reads data or a program recorded in a mounted removable recording medium 1213, such as a magnetic disk, an optical disc, a magneto-optical disk, or a semiconductor memory, and supplies the data or program to the RAM 1203 connected through an interface 1207, the external bus 1206, the bridge 1205, and the host bus 1204.

The removable recording medium 1213 is also available as a data storage area similar to the hard disk.

A connection port 1214 is a port that connects an external connection device 1215, and has a connection portion, such as USB or IEEE 1394. The connection port 1214 is connected to the CPU 1201 and other units through the interface 1207, the external bus 1206, the bridge 1205, and the host bus 1204. A communication unit 1216 is connected to a communication line and executes data communication processing with an external device. The data reading unit 1217 is, for example, a scanner, and executes reading processing for a document. The data output unit 1218 is, for example, a printer, and executes output processing for document data.

The hardware configuration of the information processing apparatus shown in FIG. 12 is a mere configuration example. The configuration of any of the exemplary embodiments is not limited to the configuration shown in FIG. 12, and may be any configuration as long as the modules described in any of the exemplary embodiments may be executed. For example, a part of the modules may be formed of dedicated hardware (for example, application specific integrated circuit, ASIC, or the like), a part of the modules may be arranged in an external system and may be connected through a communication line, and further the system shown in FIG. 12 may be multiple systems mutually connected through a communication line and the multiple systems may operate in an associated manner. Alternatively, in particular, a part of the modules may be arranged in any of a copier, a facsimile, a scanner, a printer, and a multiple-function device (an image processing apparatus having at least two functions of a scanner, a printer, a copier, and a facsimile).

The described program may be stored in a storage medium and provided. Alternatively, the program may be provided by a communication measure. In this case, for example, the above-described program may be interpreted as an aspect of the invention of "a computer-readable medium storing a program."

"The computer-readable medium storing the program" represents a computer-readable medium storing a program, the medium which is used for, for example, installation and execution of the program, and distribution of the program.

For example, the storage medium may include a digital versatile disk (DVD), particularly, "DVD-R, DVD-RW, DVD-RAM, and the like" complying with the standard formulated by the DVD forum, "DVD+R, DVD+RW, and the like" complying with the standard formulated as DVD+RW; a compact disc (CD), particularly, a compact disc read only memory (CD-ROM), a compact disc recordable (CD-R), a compact disc rewritable (CD-RW), and the like; a Blu-ray (registered trademark) disc; a magneto-optical disk (MO); a flexible disk (FD); a magnetic tape; a hard disk; a read only memory (ROM); an electrically erasable programmable ROM (EEPROM, registered trademark); a flash memory; a random access memory (RAM); a secure digital (SD) memory card; and the like.

The above-described program or a part of the program may be recorded in the storage medium, and may be stored and distributed. Also, the above-described program or a part of the program may be transmitted by using a wired network, a wireless communication network, a transmission medium with a combination of the wired network and the wireless communication network, used for a local area network (LAN), a metropolitan area network (MAN), a wide area network (WAN), the Internet, an intranet, an extranet, or the like; or may be carried on a carrier wave.

Further, the program may be a part of other program, or may be recorded in a storage medium together with a different program. Alternatively, the program may be divided and recorded in plural recording media. Also, the program may be recorded in any form, for example, a compressed form or an encrypted form, as long as the program may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one hardware processor configured to execute modules comprising:
   a quantizer configured to generate a quantized second code by further quantizing a quantized first code;
   an inverse quantizer configured to generate a third code by inversely quantizing the quantized second code generated by the quantizer;
   a calculator configured to calculate a difference between the quantized first code and the third code;
   a first encoder configured to encode the quantized second code; and
   a second encoder configured to encode the difference calculated by the calculator, wherein the quantized first code has been quantized by a quantization factor, and
   wherein the quantizer, in generating the quantized second code, is configured to compress an original image for display on a mobile terminal.

2. The information processing apparatus according to claim 1, wherein the modules executed by the at least one hardware processor further comprise:
   a decoder configured to generate the quantized first code by decoding a quantized and encoded code,
   wherein the quantizer further quantizes the quantized first code decoded by the decoder.

3. The information processing apparatus according to claim 1, wherein the modules executed by the at least one hardware processor further comprise:
   a designator configured to designate a coefficient of the quantization by the quantizer, as a relative value,
   wherein the quantizer is configured to perform the quantization in accordance with the coefficient designated by the designator.

4. The information processing apparatus according to claim 1,
   wherein the quantizer is further configured to, in generating the quantized second code, divide a result of the further quantizing the quantized first code into a first divided quantized code which is the quantized second code and a second divided quantized code,
   wherein the modules executed by the at least one hardware processor further comprise a third encoder configured to encode the second divided quantized code.

5. A non-transitory computer readable medium storing a program causing a computer to execute a process for information processing, the process comprising:
   generating a quantized second code by further quantizing a quantized first code;

generating a third code by inversely quantizing the quantized second code;
calculating a difference between the quantized first code and the third code;
encoding the quantized second code; and
encoding the calculated difference,
wherein the quantized first code has been quantized by a quantization factor, and
wherein generating the quantized second code compresses an original image for display on a mobile terminal.

6. An information processing method comprising:
generating a quantized second code by further quantizing a quantized first code;
generating a third code by inversely quantizing the quantized second code;
calculating a difference between the quantized first code and the third code;
encoding the quantized second code; and
encoding the calculated difference,
wherein the quantized first code has been quantized by a quantization factor, and
wherein generating the quantized second code compresses an original image for display on a mobile terminal.

7. The information processing apparatus according to claim 1, wherein the quantizer, in generating the quantized second code, is configured to omit high-frequency information based on a limitation of a resolution of the mobile terminal.

8. The information processing apparatus according to claim 1, wherein the quantizer, in generating the quantized second code, is configured to omit high-tone information based on a transmission time limitation.

* * * * *